United States Patent [19]

Thellmann

[11] 3,762,266
[45] Oct. 2, 1973

[54] BIMETAL FASTENER

[75] Inventor: Edward L. Thellmann, Walton Hills, Ohio

[73] Assignee: Gould Inc., Chicago, Ill.

[22] Filed: Nov. 9, 1970

[21] Appl. No.: 87,921

Related U.S. Application Data

[63] Continuation-in-part of Ser. No. 60,342, Aug. 3, 1970, abandoned.

[52] U.S. Cl. .................................. 85/37, 29/182.2
[51] Int. Cl. ............................................ F16b 19/04
[58] Field of Search ............... 85/37, 77, 78, 182.1; 29/182.2, 182.3

[56] References Cited
UNITED STATES PATENTS

| 3,685,391 | 8/1972 | Gapp | 85/77 |
| 2,399,773 | 5/1946 | Waintrob | 29/182.2 |
| 2,765,227 | 10/1956 | Goetzel et al. | 29/182.1 |
| 3,326,678 | 6/1967 | Talmage | 29/182.2 |
| 3,665,073 | 11/1962 | Hug | 28/182.3 |
| 2,393,564 | 1/1946 | Poupitch | 85/37 |

FOREIGN PATENTS OR APPLICATIONS

| 675,179 | 7/1952 | Great Britain | 29/182.2 |
| 723,307 | 2/1955 | Great Britain | 29/182.2 |
| 904,344 | 2/1945 | France | 85/37 |
| 1,010,802 | 11/1965 | Great Britain | 85/78 |

*Primary Examiner*—Edward C. Allen
*Attorney*—Edward E. Sachs

[57] ABSTRACT

A rivet of compacted powder particles having a head and a shank portion composed of relatively non-deformable material and a tail portion composed of comparatively deformable material.

6 Claims, 2 Drawing Figures

PATENTED OCT 2 1973 3,762,266

INVENTOR
EDWARD L. THELLMANN

ATTORNEY

BIMETAL FASTENER

This application is a continuation in part application of U. S. application, Ser. No. 60,342, filed Aug. 3, 1970, and now abandoned.

This invention relates generally to fasteners such as rivets, bolts and the like and, more particularly, to a rivet which is composed of parts having dissimilar metallic powder constituents.

In the prior art bimetal fasteners are used particularly in the aircraft industry. Such fasteners are made by welding dissimilar segments together. This type of welding is usually referred to as "friction welding" in which the weld is performed under pressure contact between the surfaces of the two dissimilar metal pieces. One part is held stationary while the other part is rotated and moved in the direction of the stationary part in order to establish a solid state fusion bond.

Fasteners of this type are produced to provide high strength and/or temperature characteristics. Due to the lack of ductility of certain metals, fasteners, particularly rivets of high strength material, cannot be worked. Therefore, the rivet is provided with a tail portion composed of a material which is deformable so that a radially flared bead can be formed to clamp structural materials together in the conventional manner.

It has now been discovered that a bimetal fastener of powder metal particles can provide the same or substantially similar characteristics to satisfy the needs for high strength and temperature resistance. The powder metal fastener in accordance with the present invention can be fabricated at a fraction of the cost for making friction welded metal fasteners.

It is therefore the primary object of this invention to provide a metal fastener composed of parts having dissimilar metallic constituents and which can be fabricated at a relatively low cost.

An aspect of the present invention resides in the provision of a metal fastener which is adapted for insertion into an aperture formed of two or more super-imposed structural members and which is intended to clamp such members rigidly together. The fastener comprises a coherent body of powder metal having a relatively non-deformable load bearing head portion, an adjacent shank portion and a comparatively deformable tail portion. The head and the shank portions are composed of sintered and densified powder particles of a first metal and the tail portion is composed of sintered and densified powder particles of a different second metal. The area between the shank and the tail portion constitutes the diffusion zone and consists of commingled particles, in an alloyed state, of the first and the aforesaid second metal. The shank and tail portions define a generally cylindrical body while the head portion is comparatively radially enlarged to provide an effective abutting surface.

For a better understanding of the present invention, together with other and further objects thereof, reference is had to the following description taken in connection with the accompanying drawings, and its scope will be pointed out in the appended claims.

Figure 1:
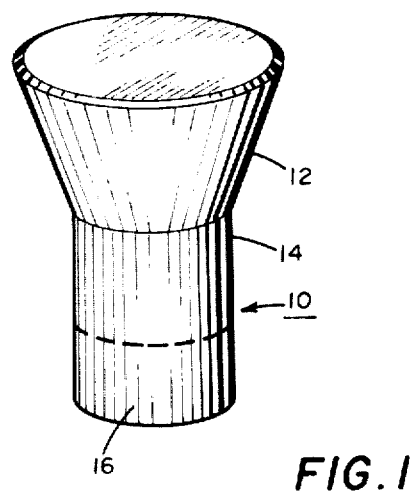
FIG. 1 is a perspective elevational view of a rivet.
Figure 2:
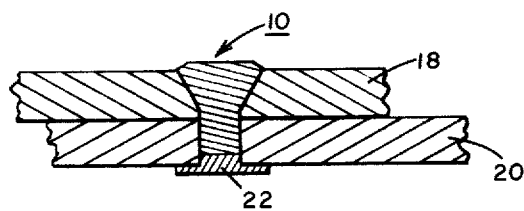
FIG. 2 is a cross-sectional view of a rivet clamping together two structural members in accordance with the present invention.

Referring now to the drawings, there is shown in FIGS. 1 and 2 a rivet 10 of a conventional configuration. The rivet 10 has a radially enlarged head portion 12 whose geometry resembles that of a truncated cone and a contiguously located cylindrical shank portion 14 which is axially aligned with the head portion and, finally, a tail portion 16 whose outer diameter is substantially identical to that of the shank portion 14. The axial length of the tail portion in comparison to the axial length of the shank portion will depend upon the overall dimension of the rivet and the thickness of the structural members which the rivet has to secure together.

For purposes of illustration, there is shown in FIG. 2 two structural plates or members 18, 20 which are super-imposed on each other and which are clamped together by means of the rivet 10. As is well known in the art, the structural members may be provided with a suitable aperture to receive the rivet.

After the rivet has been forced through these structural members 18, 20, the tail portion 16 is hammered or otherwise deformed to provide a radially extending bead 22 which, together with the rivet head portion 12, secures the structural members together. As has already been initially indicated, the tail portion is composed of a material dissimilar from that of the shank and head portions. The reason for the bimetallic approach resides in the necessity to provide a material for the tail portion which can be deformed so as to establish the radial bead or flange 22. For this reason, the axial distance of the tail portion need only be sufficient in order to satisfy the requirements for establishing the bead. In other words, in accordance with the invention, substantially the whole segment of the rivet which protrudes beyond the second structural member 20 in the illustration is composed of a deformable material.

The rivet 10 has a head portion 12 which is composed of a relatively non-deformable metal powder particulate such as a titanium alloy. The additives include metal powder materials that have high tensile strength such as tungsten, molybdenum and vanadium. It has been found that a composition of 4 percent vanadium, 6 percent aluminum, with the balance being constituted of titanium (in weight percent) has particularly desirable characteristics. Powder particulates may be pre-alloyed or in elemental form. The composition provides a material which is relatively light weight and yet satisfies the requirement for anti-deformability. For reasons of expediency, the shank portion 14 is composed of the same material as the rivet head 12 although this requirement is not essential.

In order to provide for a rivet tail portion 16 which is deformable in comparison to the hardness of the rivet head 12, the tail portion is composed of a material which is compatible to the metals establishing the adjacent interface in order to facilitate a strong intermetallic bond. Thus, for the specific example given above, the tail portion is composed of pure, i.e. commercially pure titanium powder particles. The metallurgical compatibility between the powder particles of the pure titanium and the above mentioned titanium base alloy is such that a diffusion zone consisting of commingled particles, in an alloyed state, of the pure titanium and the titanium alloy can be readily established. It is known in the metallurgical art that such a diffusion zone, between compatible materials, provides a bond which satisfies the requirements for applications of this kind.

The following is a description of the method for making the rivet in accordance with the invention. Those skilled in the art will recognize, however, that this method and this invention can also be used for metal fasteners such as bolts, screws or the like, which are adapted for unique and unconventional applications.

The metallurgical powder metal process comprises the placing of powder particulates of a first metal into a die cavity. Alternatively, a partially pre-densified slug may be utilized. The remainder of the die cavity is then filled with powder particles of the second metal. The term "first" and "second" metal is used herein to denote and differentiate between the material used for the head and shank portion and the dissimilar material used for the tail portion.

The powders are compacted by conventional means to about 85 percent of theoretical density. Thereafter, the compacted material is removed from the die and placed into a vacuum or neutral environment and is sintered at a temperature between 2,200 and 2,400 degrees F for about 2 to 5 hours, the time depending upon the pre-selected temperature conditions. The part is then cooled while still under a protective environment. Hereafter, the part which now has the shape of rivet 10 is again subjected to a thermal treatment of up to 2,000 degrees F and in this heated stage is placed into a die cavity having a temperature of about 500 to 800 degrees F. A suitable tool then compacts the part to essentially 100 percent of theoretical density into the final predetermined shape. In most applications, the rivet will now be cooled at room temperature and can be used in this form or can be again subjected to further commercial heat treatment which, however, should not affect the titanium alloy composition.

The present invention is not limited to a monolithic fastener, but also finds application in dual (or multi) member fasteners such as, for instance, a rivet-like sleeve which is radially expandable or deformable by a threaded nut.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A metal fastener for insertion into an aperture formed of two or more super-imposed structural members for clamping them rigidly together, comprising: a coherent body of powder metal compacted and sintered to establish essentially 100 percent of theoretical density, said body having a relatively non-deformable load-bearing head portion, an adjacent shank portion, and a comparatively deformable tail portion, said head and said shank portion being composed of sintered and densified powder particles of a titanium base alloy and said tail portion being composed of sintered and densified powder particles of pure or commercially pure titanium, the area between said shank and tail portions constituting a diffusion zone consisting of commingled particles, in an alloyed state, said shank and tail portions defining a generally cylindrical body and said head portion defining a body comparatively radially enlarged effective to provide an abutting surface.

2. A metal fastener according to claim 1, wherein said fastener is a rivet.

3. A metal fastener according to claim 1, wherein said titanium base alloy comprises tungsten, molybdenum, vanadium and aluminum.

4. A metal fastener according to claim 1, wherein said titanium base alloy comprises in weight percent approximately 4 percent vanadium, 6% aluminum, and the balance titanium.

5. A metal fastener according to claim 1, wherein said head portion is adapted to be inserted into the aperture of the structural members and wherein the thickness along the transverse axis of the fastener decreases from the outer axial end of the head portion towards said shank portion.

6. A metal fastener according to claim 1, wherein said coherent body is a solid integrally formed member of densified powder particles.

* * * * *